United States Patent [19]

Oswald

[11] Patent Number: 4,969,001
[45] Date of Patent: Nov. 6, 1990

[54] SHEET-FILM CASSETTE LOAD INDICATOR

[75] Inventor: Anton Oswald, Esslingen, Fed. Rep. of Germany

[73] Assignee: Eastman Kodak Company, Rochester, N.Y.

[21] Appl. No.: 377,354

[22] Filed: Jul. 7, 1989

[30] Foreign Application Priority Data

Apr. 9, 1987 [DE] Fed. Rep. of Germany ....... 3711997

[51] Int. Cl.$^5$ ............................................. G03B 17/26
[52] U.S. Cl. .................................................. 354/284
[58] Field of Search ................ 354/276, 281, 283, 284

[56] References Cited

U.S. PATENT DOCUMENTS 4,248,172 2/1981 Kröbel et al. ................... 354/276 X
4,493,545 1/1985 Bauer et al. ..................... 354/284 X

FOREIGN PATENT DOCUMENTS 825947 12/1951 Fed. Rep. of Germany .
7928371 1/1980 Fed. Rep. of Germany .

Primary Examiner—Brian W. Brown
Attorney, Agent, or Firm—G. Herman Childress

[57] ABSTRACT

Sheet film cassette with loaded/unloaded indicator in the form of a member slidable vertically with respect to the film plane and mounted in the portion of the cassette that positions the film and opposite the exposure window, such that the outer end of the slidable member is flush with the outer surface of the cassette in the loaded condition, and is recessed within the outer surface in the unloaded condition. A labyrinth mounting for the member provides light-tightness.

3 Claims, 2 Drawing Sheets

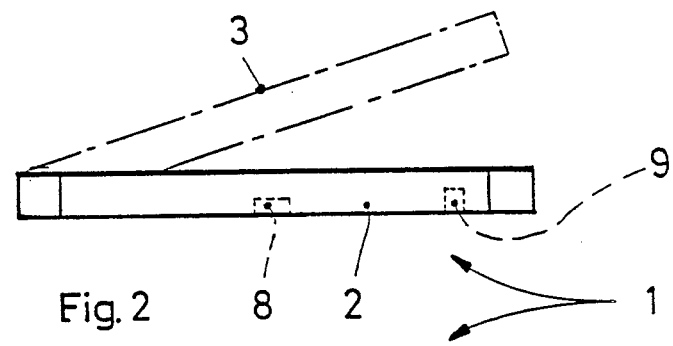
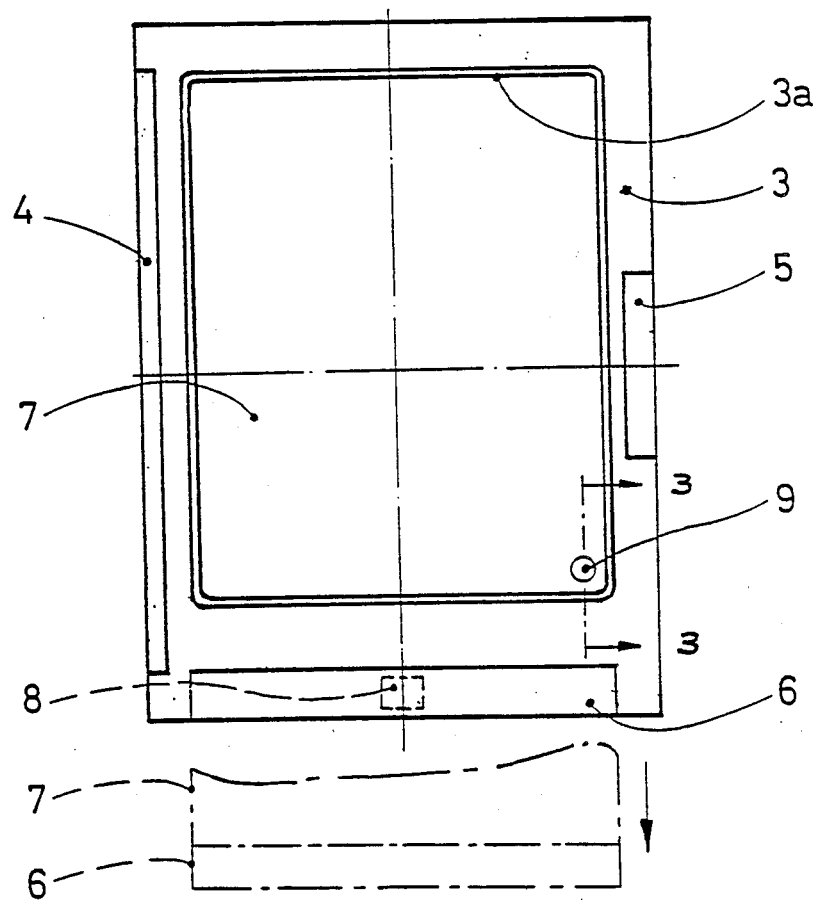
Fig. 2
Fig. 1

SHEET-FILM CASSETTE LOAD INDICATOR

TECHNICAL FIELD

The invention relates to a sheet-film cassette with two cassette portions connected by a hinge, one portion of which comprises an exposure window which can be closed by a light-shielding slider and in the other portion of which a sheet film can be positioned, and with an indicator member movable relative to the outer surface of the cassette, said indicator member assuming a first detectable position when the cassette is loaded and a second detectable position when the cassette is not loaded.

BACKGROUND ART

A cassette of the above type is known from DE-PS No. 30 40 819 in which the use of a film-indicator device according to DE-PS No. 28 38 058 is proposed. See also DE-GM No. 7 928 371, DE No. 2856703, and DRP No. 825,947. In accordance with DE-PS No. 30 40 819 the film-indicator device is arranged in the upper portion of the cassette, which comprises the exposure window. However, owing to the limited space available the upper portion which forms a frame around the exposure window is unsuitable for the arrangement of such a film-indicator device because the light-shielding slider is guided, the sheet film pressed onto its support, and the light-protecting, labyrinth located, in this area. The other prior art has similar shortcomings.

DISCLOSURE OF THE INVENTION

A sheet-film cassette of the generic type such that its film-indicator device does not necessitate any constructional restrictions, is provided.

In accordance with the invention the movable indicator member is arranged on the cassette portion which positions the sheet film and opposite to the opening of the exposure window.

Advantageously, the indicator member according to the invention is cylindrical and is guided positively, and movable by its own weight in a bore arranged vertically to the plane of the sheet film. The mounting for the member includes a light-tight labyrinth.

According to another useful modification of the invention the indicator member is movable from a position in which it is flush with the outer surface of the cassette portion positioning the sheet film to a position in which said bore is partially cleared, a color mark arranged in the bore becoming visible in said cleared position.

Preferably the indicator member according to the invention is arranged at a suitable point of the cassette opposite to the opening of the exposure window and can enter unobstructedly the exposure window without any special constructional measures having to be taken.

BRIEF DESCRIPTION OF THE DRAWINGS

Further features and advantages can be inferred from the description of an embodiment of the invention illustrated in the drawings and from the subclaims. In the drawings:

FIG. 1 shows a plan view of a sheet-film cassette;

FIG. 2 shows a lateral view of the cassette according to FIG. 1;

MODES OF CARRYING OUT THE INVENTION

Figure 3:
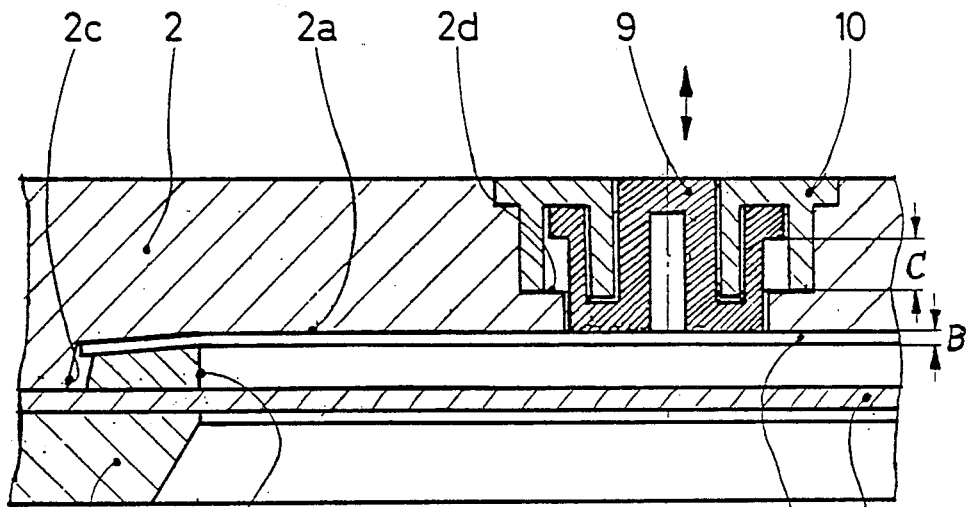
FIG. 3 shows a sectional view along line A—A with a sheet film loaded.

A sheet-film cassette 1 comprises a lower portion 2 and an upper portion 3 which are connected with each other by a known type of hinge 4 not illustrated in detail.

The upper and lower portions of cassette 1 are locked by an automatically or manually actuated locking device 5 not illustrated in detail.

The upper portion 3 of cassette 1 comprises an exposure window 3a which can be closed by a light-shielding slider 7 having a grip piece 6. A manually operable locking device 8 for the light-shielding slider 7, which is not illustrated in detail, is arranged on grip piece 6.

The lower portion 2 of cassette 1 (shown in FIGS. 3 and 4 in the top position to facilitate understanding of the invention) comprises a support surface 2a for a sheet film 11, which is surrounded by an uninterrupted frame 2c. The two shorter marginal areas 2b of support surface 2a are sloped upwardly by an angle of about 6 degrees (see FIG. 4).

Correspondingly shaped surface areas 3b on the upper portion 3 of cassette 1 are located opposite, and parallel to the marginal areas 2b. The longer sides of exposure window 3a have surface areas 3d extending parallel to the support surface 2a.

Between the support surface 2a with its two sloping marginal areas 2b in lower portion 2 and the uninterrupted surface areas 3b, 3d of upper portion 3 which run parallel to said support surface 2a, a space "B" is provided which is adapted to receive a sheet film 11.

Due to the sloping marginal areas 2b, 3b of cassette 1 the two shorter marginal areas of sheet film 11 are bent upwardly so that the sheet film is pretensioned in the direction of the support surface 2a of the lower portion 2 of cassette 1 and rests in a plane position on the support surface 2a.

Lower portion 2 and upper portion 3 of cassette 1 are light-tight by the provision of labyrinth-type configurations not illustrated and further sealing means of a known type which are arranged in the area of the guide slot of light-shielding slider 7.

In order that it can be determined in the closed position of sheet-film cassette 1 whether or not a sheet film 11 has been loaded, cassette 1 is provided with a load-condition indicator device.

The load-condition indicator device comprises a cylindrical indicator member 9 movable vertically to the support surface 2a for the sheet film. The indicator member 9 is guided in a sleeve 10 mounted in an opening 2d of the lower cassette portion 2, and under the action of its own weight, slides in an outwardly open bore 10a of sleeve 10. The inner wall of bore 10a is provided with a color mark or other indicia 10b which, depending on the position of the indicator member 9, is either visible on the outer side of the cassette or covered.

The indicator member 9 and the sleeve 10 are interlocked in a labyrinth-type manner to provide a light seal and are designed such that the indicator member 9 is movable to and fro over a distance "C".

The indicator member 9 is arranged opposite to the opening of the exposure window 3a and is guided for movement over the distance "C" from a position in which it is flush with the outer surface of the lower cassette portion 2 to a position in which it enters to a limited extent the opening of the exposure window 3a.

The cassette 1 is loaded in the position in which the lower cassette portion 2 is located at the bottom as shown in FIG. 2. In this position, the indicator member 9 is flush with the outer surface of the lower cassette portion 2 and does not extend beyond the support surface 2a for the sheet film 11.

In order to detect whether a sheet film 11 is present or not in a closed cassette 1, the cassette 1 is turned upside down such that the lower cassette portion 2 is at the top as shown in FIG. 3. With a sheet film 11 loaded, the indicator member 9 according to FIG. 3 contacts sheet film 11 and thus cannot move. This "cassette-loaded" condition can be recognized by the flush alignment of the indicator member 9 with the outer cassette surface and by the fact that the color mark or other indicia 10b is covered.

Figure 4:
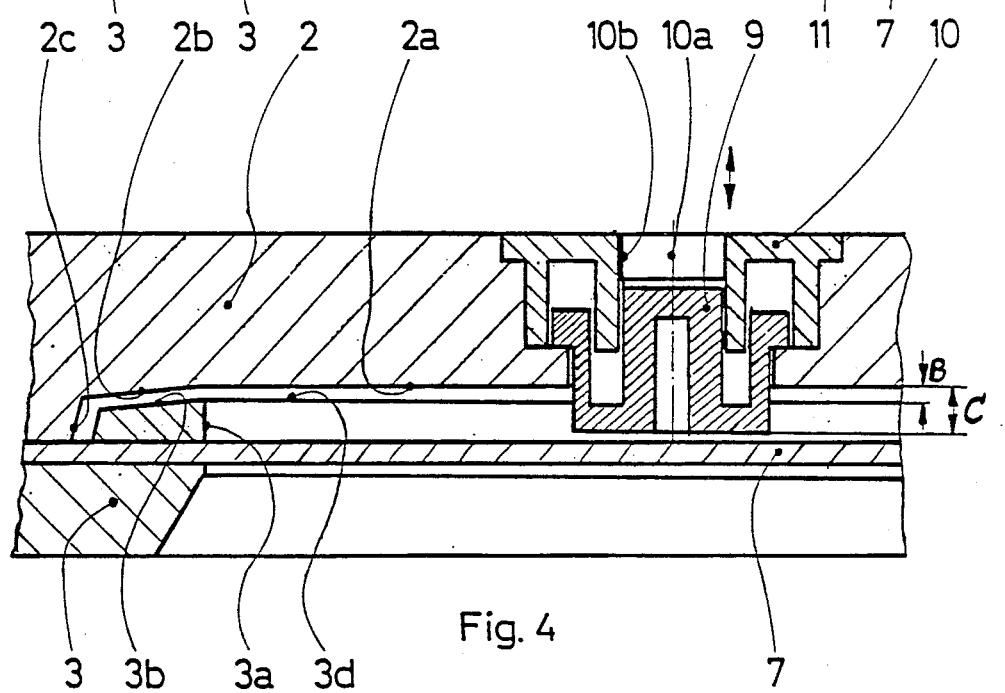
FIG. 4 shows the device according to FIG. 3 with no sheet film present.

However if there is no sheet film 11 loaded in cassette 1, the indicator member 9 drops by its own weight by the distance "C" downwardly into the opening of the exposure window 3a as shown in FIG. 4.

This clears the color mark 10b in the bore 10a so that it is visible from outside that there is no sheet film loaded in cassette 1.

When the indicator member 9 drops inwardly by the distance "C" a recess is formed on the outer cassette surface by the bore 10a. This recess can be sensed so that the load condition can be ascertained even in a darkroom, without the cassette having to be opened.

As can be seen in particular from FIG. 1 the load-condition indicator device 9, 10 is preferably arranged in the area adjacent to the locking device 8 for the light-shielding slider 7.

Since the operating means of the locking device 8 of the light-shielding slider are associated with the same outer cassette surface as the load-condition indicator device 9, 10 (see FIGS. 1 and 2), handling of cassette 1 is facilitated because both means are located in the same field of vision.

In contrast with the embodiment just described the load-condition indicator device 9, 10 may also be arranged at another point opposite to the opening of the exposure window 3a.

The plane position of sheet film 11 is affected by none of the arrangements possible because the indicator member 9 acts on the sheet film without spring-force, solely by the action of its own weight.

The invention has been described with reference to a preferred embodiment. However, it will be appreciated that variations and modifications can be effected within the ordinary skill in the art without departing from the scope of the invention.

I claim:

1. In a sheet film cassette having two portions hinged together to move between open and closed relation, a first of said portions having a frame provided with an exposure window, the second of said portions having means for positioning a film for exposure through said window; the improvement providing ready detection by manually sensing the outside surface of the cassette as to whether the cassette is loaded with film or unloaded, comprising:

an indicator member on said second portion, said indicator member being aligned with said exposure window when said cassette portions are in closed relation, said member being movable with respect to said second portion toward and away from said exposure window between first and second positions which are detectable from outside the cassette, said member having an inner end and an outer end, said first position being defined by contact of the inner end of said member with film in the cassette to indicate the presence of film in the cassette, whereas in said second position the inner end of said member is located nearer to said exposure window than in said first position, thereby indicating the unloaded condition.

2. The improvement according to claim 1, wherein said indicator member is cylindrical and said second cassette portion has a bore in which said indicator member is slidably mounted so as to be moveable by its own weight toward said exposure opening when the closed cassette is positioned with said second portion above said first portion.

3. The improvement according to claim 2, wherein said outer end of said indicator member is flush with the outer surface of said second portion when said member is in said first position, and is recessed below said outer surface when in said second position.

* * * * *